Sept. 29, 1936.  L. A. WESTON  2,055,885
METHOD OF FORMING PIPE JOINTS
Filed Jan. 21, 1935   3 Sheets-Sheet 1
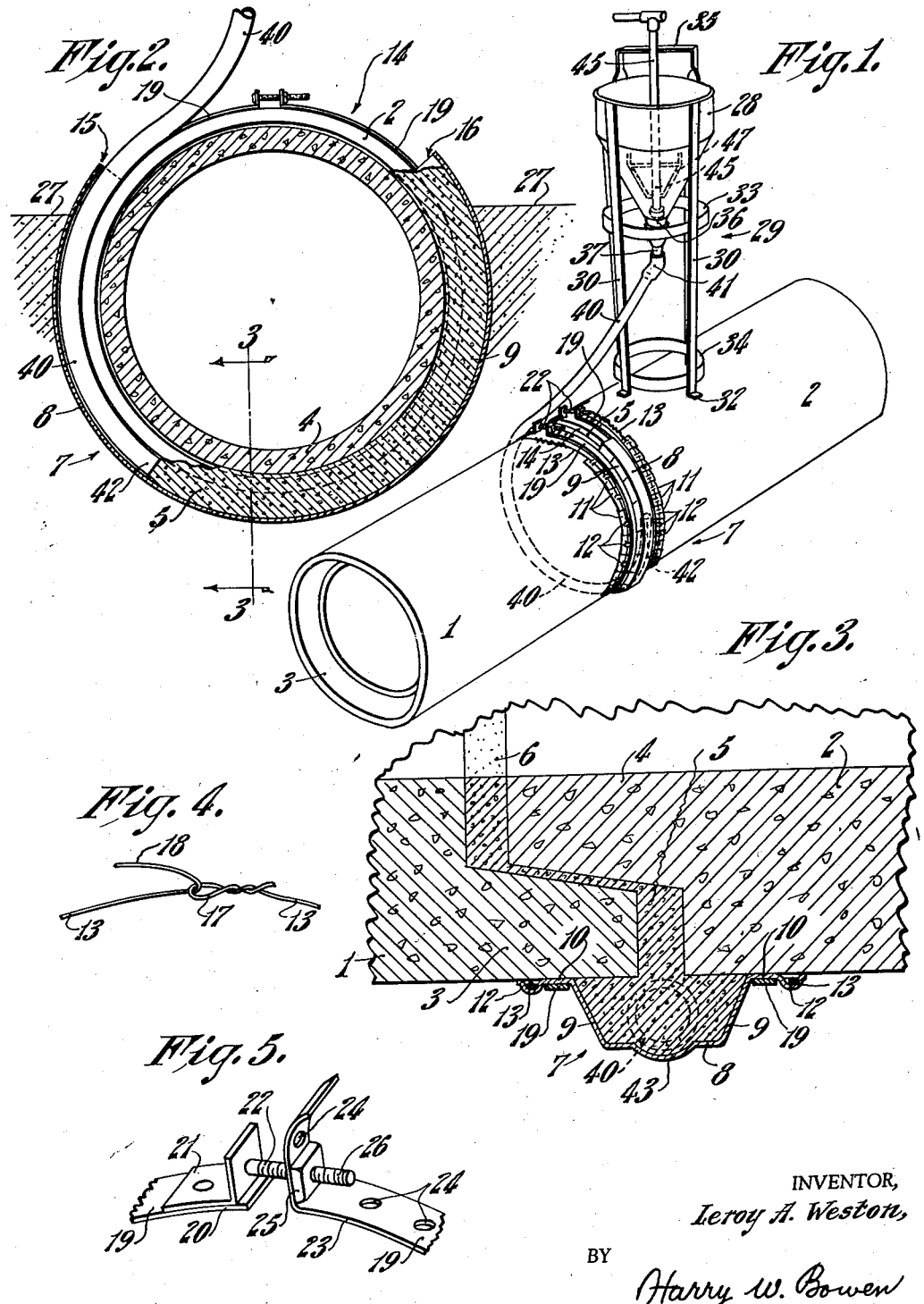
INVENTOR,
Leroy A. Weston,
BY
Harry W. Bowen
ATTORNEY.

Sept. 29, 1936.  L. A. WESTON  2,055,885
METHOD OF FORMING PIPE JOINTS
Filed Jan. 21, 1935  3 Sheets-Sheet 2
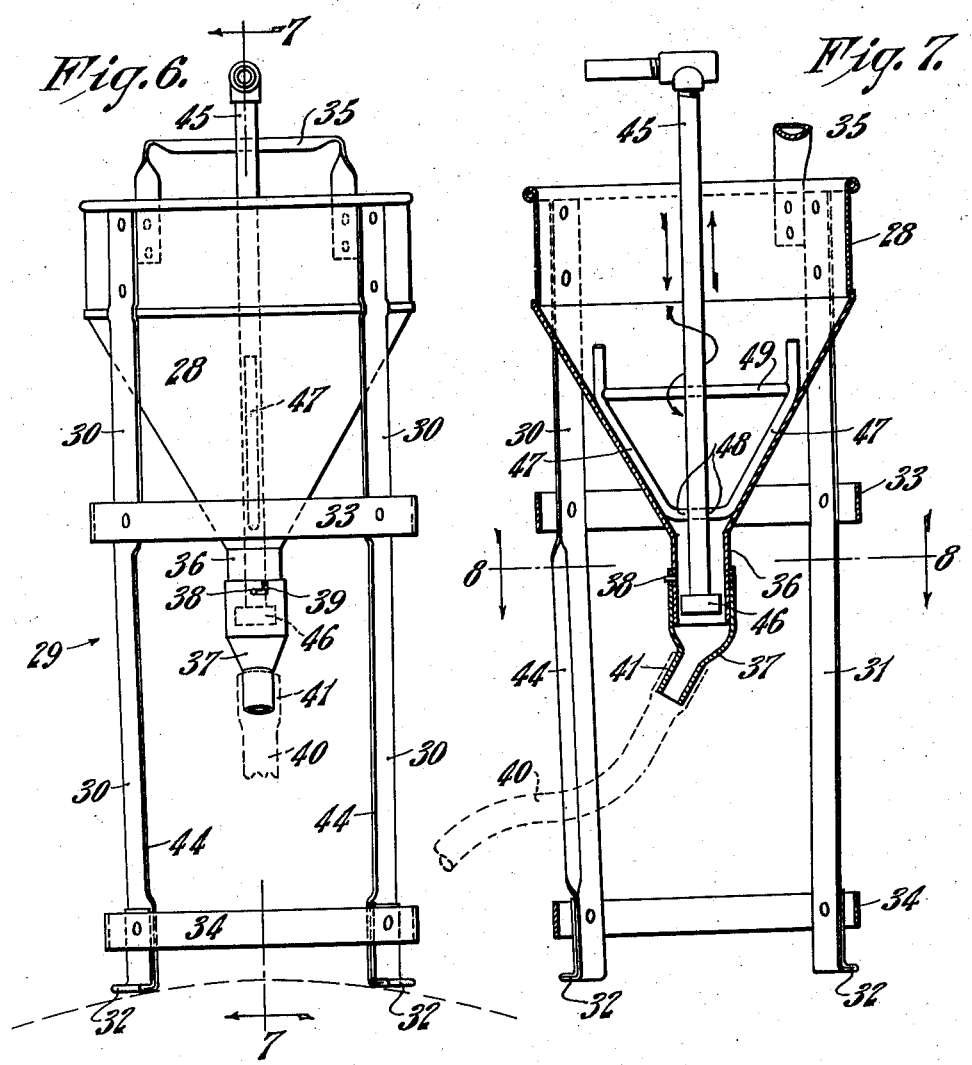
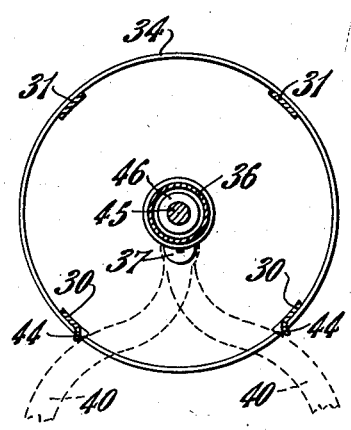
INVENTOR,
Leroy A. Weston,
BY
Harry W. Bowen.
ATTORNEY.

Sept. 29, 1936.    L. A. WESTON    2,055,885
METHOD OF FORMING PIPE JOINTS
Filed Jan. 21, 1935    3 Sheets-Sheet 3
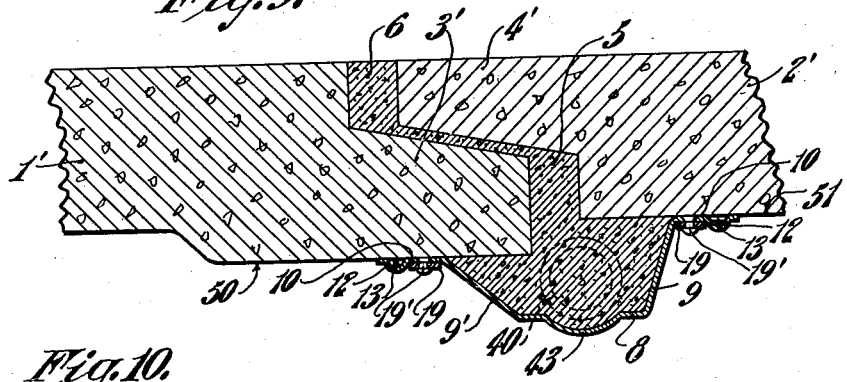
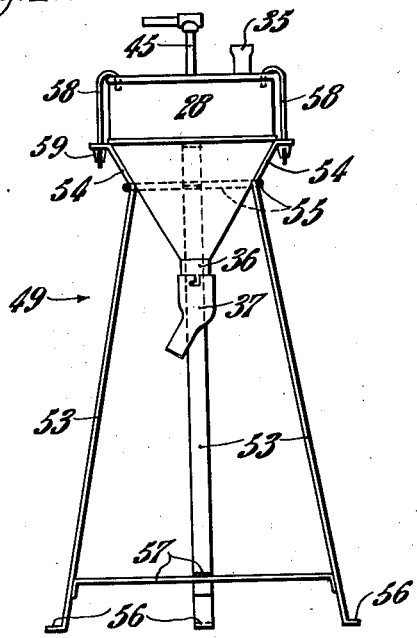
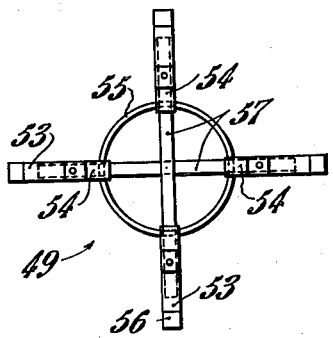
INVENTOR,
Leroy A. Weston,
BY
Harry W. Bowen.
ATTORNEY.

Patented Sept. 29, 1936

2,055,885

UNITED STATES PATENT OFFICE 2,055,885

METHOD OF FORMING PIPE JOINTS

Leroy A. Weston, Adams, Mass.

Application January 21, 1935, Serial No. 2,737

3 Claims. (Cl. 25—155)

My invention relates to improvements in the method of and apparatus for forming pipe joints, and is particularly adaptable to the larger sizes of cement and tile pipe, such as are used in drainage, sewerage, water supply, and irrigation projects.

Pipe lines for drainage, sewerage, water supply, and irrigation works are generally laid in trenches, often partially filled with water. Under such conditions, it is difficult to lay and maintain the pipe in true alignment. If the water is present, it is practically impossible to fill the joints with cement, unless the trench is pumped dry and kept dry by pumping, until the cement has set sufficiently to prevent being carried away by the water. The trenches are backfilled, while the cement joints are still "green", often resulting in cracked joints, misalignment of the adjacent pipes, and leakage.

If the pipe is dry, it is extremely difficult to make the jointing material adhere to the pipe, especially below the spring line of the pipe, as the force of gravity tends to cause the jointing material to fall from the pipe. It is an object of this invention to provide a form for holding the jointing material in the joint and against the outside of the pipe adjacent the joint.

It is a further object of this invention to provide means for cementing the joint in the pipe, after the trench has been partially backfilled. By this method and apparatus, the trench may be backfilled up to and even somewhat above the center line of the pipe, before the joint is poured, thereby providing a permanent and substantial set and foundation for the pipe, before the cement joint is formed, which relieves the cement joint of any strains, or distortion, caused by shock and vibration of the pipe, during backfilling operations.

A third object of this invention is to provide means for confining the jointing material around the pipe joint and preventing the jointing material from being carried away by water which may be running in the pipe trench, thereby eliminating the need for pumping operations.

A fourth object of this invention is to provide means and methods for forcibly injecting the jointing material into the joint form, after the trench has been partially backfilled.

Forms have been used before for pipe joints, but invariably they have been designed for the introduction of the jointing material at the top of the pipe only, and the weight and consistency of the material have been depended upon to fill the form. This method often results in the forming of air pockets and voids in the joint. Under these conditions, a tight, full joint, proof against either infiltration or exfiltration, is uncertain and unpredictable. It is an object of this invention to provide means for introducing the jointing material at any desired location with the form, whereby the jointing material may be first introduced, if desired, at the opposite end of the form from its entrance, and the point of introduction gradually withdrawn, as the material is ejected into the form, until the form is solidly and completely filled, without voids or pockets of any kind, producing a tight joint which will prevent infiltration in sewerage and drainage systems and exfiltration in water supply and irrigation systems.

Broadly, the steps in the method are as follows:—first, the pipe is laid in the prepared trench and lined up; second, the joint forms are placed in position and temporarily secured over the pipe joints; third, the joint forms are securely and permanently clamped in position around the joints; fourth, the pipe trench is partially backfilled, up to or slightly above the center, or spring line, of the pipe, and the backfill is firmly tamped or puddled; fifth, the joint form is filled by forcibly injecting the jointing material into the same; sixth, a small portion of the joint at the top of the pipe is formed by hand, between the open ends of the joint form; and lastly, the remainder of the trench is backfilled, covering the pipe and completing the work.

The apparatus, by means of which the above-described method is carried out, comprises broadly, in co-operation with adjacent sections of pipe, an annular joint form, which when in position around the pipe joint, will cover all but a small portion of the joint at the top of the pipe, means on the form for temporarily securing the form in position over the pipe joint, means on the form for permanently clamping the same in position and providing a tight and continuous contact of the form and pipe on both sides of the pipe joint, a container for the jointing material, a support for the container so designed and proportioned that it may rest on the top of the pipe adjacent the form and support the container in an easily accessible position, means for conducting the jointing material from the container into the joint form, and means for agitating the jointing material in the container and forcing the same from the container, through the conducting means and into the form.

For the purposes of illustration and description, I have shown in the accompanying drawings, and will describe in the following specification, a preferred form of my invention, as used with cement, or tile pipe, having a uniform outside diameter and having each section of pipe formed with a male annular rabbet at one end and a female annular rabbet at the opposite end. It will be readily understood, by those skilled in the art, that the apparatus thus described, may be easily adapted for use with other forms of pipe, such as the bell and spigot type, or others.

The preferred form of my invention, and its objects and advantages are completely and clearly disclosed and described in the accompanying drawings, the specification, and the appended claims.

In the drawings:—

Fig. 1 is a perspective view of adjacent sections of pipe with the apparatus in place.

Fig. 2 is a cross, sectional view of the pipe joint and form.

Fig. 3 is a partial, sectional view on the line 3—3 of Fig. 2.

Fig. 4 is a detail view of one of the wire fastenings used for temporarily securing the form in place.

Fig. 5 is a partial, perspective view of one of the clamping devices for permanently clamping the form in place on the adjacent pipe ends.

Fig. 6 is an elevational view of the container for the joint-forming material and supporting frame for the container.

Fig. 7 is a vertical, sectional view on the line 7—7 of Fig. 6.

Fig. 8 is a cross, sectional view on the line 8—8 of Fig. 7.

Fig. 9 is a view similar to Fig. 3, illustrating the use of my joint form on another style of pipe.

Fig. 10 is an elevational view, partly in section, of a modified form of standard used with the container, and Fig. 11 is a top plan view of the standard, or frame, shown in Fig. 10.

Referring now to the drawings in detail, in which like numerals refer to like parts throughout:—

Pipe sections 1 and 2 are formed with an outer annular flange 3 at one end and an inner annular flange 4 at the opposite end. In assembling the pipe sections, the flange 3 of the pipe 1 is placed over the flange 4 of the pipe 2, and the pipe sections are spaced to form an outer joint 5 and an inner joint 6, which will be in staggered relation to each other, as indicated in Fig. 3. After the assembly, the inner joint 6 is "wiped" or filled, by hand from the interior of the pipe. A joint form 7, of sheet metal, fiber, paper, or other suitable material, is placed or located over the outer joint 5. The form 7 is approximately channel-shaped in cross section, having a back portion 8, side wall portions 9, diverging outwardly from said back portion, and outwardly extending flange portions 10, which are approximately parallel to the back portion 8. The flange portions 10 and side walls 9, are slitted to form resilient, overlapping sections 11 which are adapted to compensate for unevenness and inequalities in the outer surface of the pipe and also provide sufficient flexibility for securing the form on pipes of varying diameters. I may also make these forms, without slitting the flanges 10 and side walls 9, particularly when the forms are manufactured of molded material, such as fiber, or paper. The flanges 10 are provided with struck-up lobes, or flaps 12, and a fastening, or securing wire 13, is secured on each flange portion 10 under the flaps 12. As will be noted in Figs. 1 and 2, the form 7, when secured over the pipe joint 5, provides an opening 14 between the upper ends 15 and 16 of the form. The form 7 is first secured in place by fastening the ends of the wires 13, as indicated in Fig. 4, one end of the wire 13 being formed with a loop 17, through which the opposite end 18 is drawn and then twisted. The form is then securely clamped in place and tightly drawn against the pipe sections 1 and 2 to prevent leakage of cement out of the form, by means of the flat, metal bands 19, placed over the flanges 10 between the sides 9 and the wires 13. An end 20 of the band 19 is provided with a bracket 21 on which is secured a threaded stud 22. The opposite end 23 of the band 19 is provided with a plurality of spaced openings 24. When assembling on a pipe form, as indicated in Fig. 1, the bands 19 are drawn tightly around the flanges 10, the end 23 bent up, as indicated in Fig. 5, the stud 22 inserted in the nearest opening 24, and each band 19 further tightened by drawing up a nut 25 on the threaded portion 26 of the stud 22.

For convenience, the bands 19 may be secured on the flanges 10 at a point approximately opposite the ends of the band 19, as indicated by rivets 19' in Fig. 9.

With the form 7 in place, the pipe sections carefully aligned, and the bands 19 tight, the pipe trench may be backfilled up to a point just below the ends 15 and 16 of the form 7, as indicated at 27 in Fig. 2. The jointing material is inserted in the form 7, by means of the apparatus, illustrated in Figs. 1, 6, 7, 8, or 10 and 11. A funnel-shaped container 28 is secured in a frame 29, comprising leg members 30 and 31 formed with foot portions 32 and reinforced with hoop members 33 and 34. A handle 35 is secured on the container 28 for providing convenient means for carrying and placing the frame 29 and container 28. The lower end, or apex, of the funnel-shaped container 28 is formed with a spout 36, on which is removably secured a reducing spout 37, by means of a stud 38 on the spout 36 and a bayonet slot 39, formed in the spout 37. When in use, the frame 29 is set on one of the pipe sections, and a length of flexible hose 40 is arranged with an end 41 over the spout 37 and the opposite end 42 inserted within the form 7, as indicated in Figs. 1 and 2. The back 8 of the form 7 is crowned, as indicated at 43 in Fig. 3, primarily to reinforce and strengthen the back 8, and also to provide room within the form 7 for the hose 40. The hose 40 may be inserted in the form 7, either at the open end 15, or the open end 16, and may be pushed around within the form, as indicated in Fig. 1, and gradually withdrawn, as the jointing material is expelled from the hose into the form. The leg members 30, of the frame 29, are bent outwardly between the hoops 33 and 34, as indicated at 44, to prevent chafing and cutting of the hose 40, as it may contact the legs 30, as indicated in Fig. 8, and to prevent injury to a person when removing the hose 40 from the nozzle 37.

A plunger rod 45, formed with a head portion 46, at its lower end, provides means for forcing the jointing material in the container 28 into the spout ends 36 and 37 and thence through the hose 40 into the form 7. Rods 47, secured on the plunger rod 45 at 48 and braced near their upper ends by the rod 49, also secured on the plunger rod 45, form, in co-operation with the plunger rod 45, a frame which conforms in shape to the interior of the container 28 and provides a stop or limit position for the downward movement of the plunger rod 45. The rods 47 and 49 also provide means for agitating the joint-forming material in the container 28, when the plunger 45 is moved up and down, or oscillated about its axis, or both.

The frame 29, provided with the four foot members 32, will set firmly and solidly on curved surfaces of varying radii, such as are encountered by setting the frame 29 on the top of pipe of varying diameters, and the metallic form 7, provided with the overlapping, resilient sections 11, naturally adapts itself to pipe within a considerable range of diameters. Below and above this range, forms of smaller, or larger size, may be provided.

The nozzle, or spout 37, is removable to provide for cleaning itself and the spout 36. Also, if the jointing material should jam, or stick, in the member 37, the same may be quickly removed and cleaned, or laid aside and another similar member substituted therefor, without holding up operations. By providing different sizes of spouts 37, different sizes of hose may be used to provide the maximum efficiency and conducting conditions for the consistency and aggregate of the jointing material used.

Fig. 9 illustrates an adaptation of the form 7 on another form of pipe, in which the outer annular flange 3' is somewhat thicker than the inner annular flange 4'. When co-operating flanges of this form of pipe are assembled, as indicated in Fig. 9, the outer surface 50 of the flange 3' projects beyond the outer surface 51 of the pipe 2'. The form 7 adapts itself to this difference by spreading of the side wall 9'.

A modified form of frame 49 for the container 28 is illustrated in Figs. 10 and 11. With this form of frame, the container 28 is removably supported therein, and a single container may be used progressively in a series of frames previously set up, or one container may be substituted for another, which has become clogged, or otherwise rendered inefficient for its purpose. A plurality of leg members 53, preferably of flat metal, are bent outwardly at 54, at an angle conforming with the funnel-shaped bottom of the container 28, and co-operate to provide a supporting seat for the container 28. A hoop member 55, spot welded, or otherwise secured to the legs 53, at the base of the portions 54, provides a reinforcing element which materially aids in the support of the container 28. The leg members 53 are bent outwardly at their bases to provide foot portions 56, and braces 57 welded to the legs 53 above the foot portions 56, securely brace and tie the legs 53. Hook bolts 58, provided with wing nuts 59, serve to removably secure a container 28 in the frame 49.

I have thus provided a method and means for jointing whereby the pipe trench may be partially backfilled to firmly embed the pipe in proper alignment, and then a strong, solid joint formed between and over the adjoining ends of the pipe sections. It will be noted, in Figs. 3 and 9, that this method and form provides, in addition to the filled joint between the pipe sections, a heavy, annular and permanent, reinforcing hub, or ring, around adjacent ends of the pipe sections which is relatively larger in cross sectional area than the filled joint between the ends of the pipe.

It is to be understood that I do not limit myself to the use of sheet metal for the member 7, as I may, if desired, use heavy cloth, as canvas, or molded material, as paper pulp of different kinds.

In operation, the form is first slipped over the end of the last section of pipe, the next section of pipe is then set in proper position and the form slipped back until it covers the joint. The form is then temporarily secured with the wire fastenings while the nuts 25 are removed from the studs 22, the studs 22 inserted in openings 24 in bands 23, and the nuts 25 replaced on the studs 22 and drawn tight, thus pulling up the bands 23 on the form 7. If the pipe is laid in a trench, the trench is then backfilled up to, or slightly above, the spring line of the pipe. The frame and container are then set on the pipe adjacent the form, and filled with the joint-forming material. The hose 40 is inserted in an open end of the form, such as the end 15, and pushed around until the open end of the hose is visible from the opposite, open end 16 of the form. The jointing material is then forced through the hose by manipulation of the plunger 45, until the joining material fills the form approximately flush with the opening 16, ahead of the hose 40. The hose 40 is then gradually withdrawn as the jointing material is continually forced therethrough, either in a steady continuous movement, or by a series of short reciprocating movements, depending upon conditions; the rate of movement being governed to maintain the jointing material flush with the end 16, until the hose emerges from the end 15. The top of the joint, between the ends 15 and 16 of the form 7, is then completed by hand. This method of filling the joint form from one end prevents the formation of air pockets and voids in the joint, and insures a solid, tight joint. It will be noted that by providing, in addition to the filled joint, an annular reinforcing rib around the joint which overlaps the joint on both sides, I have materially increased the surface area and lineal distance opposed to both infiltration and exfiltration.

The joint form disclosed in this application is designed for use with pipe of large diameters, and differs from the form disclosed in my application bearing Serial Number 593,313, and filed February 16, 1932, which is adapted for use with pipe of relatively small diameter, in the reinforcing element 43 and the combination of wire-fastening means and the clamping bands 23.

It should be observed that by reason of the large mass of joint-forming material under the joint form band 7, which is spaced a material distance from the adjacent ends of the pipe sections; a strong joint is produced across the outer end of the joint, indicated at 5, whereby the opening of this joint will be prevented, particularly, if the adjacent ends of the pipe sections should have a tendency to get out of alignment. The large mass of the concrete, under the joint form 7, will effectually prevent such a breakage. The joint form is a permanent construction.

What I claim is:—

1. A method of forming pipe joints which consists in securing a band or ring in spaced relation from the pipe and around adjacent pipe ends that are axially spaced from each other, then inserting a flexible tubular member within the spaced band and completely around the joint, then forcibly injecting joint-forming material through the flexible tubular member into the space between the pipe sections and completely filling the band and said space between the pipe ends as the tubular member is withdrawn, whereby no air pockets will be formed in said spaces.

2. That method of forming sewer pipe joints with cement, or the like, which consists in placing a band that is radially spaced away from the joint to be filled, by inserting a hose into the space between the band and the pipe and completely around the joint to be filled, then forcing the cement, or the like, through the hose and gradually withdrawing the hose as the space in the band and the joint are filled with the cement, or the like.

3. A process for forming pipe joints between pipe sections having male and female end formation which comprises, first, assembling adjacent pipe sections in spaced relation end to end, second, securing a closure member on each of said pipe sections in watertight relation therewith to form an enclosed space at and on either side of said spaced ends, third, introducing a joint-forming material within said enclosure by inserting the delivery end of a hose all the way around the joint and then withdrawing the hose in progressive movement from around said pipe ends, whereby the material is deposited within the enclosure in the location where it takes its final set and is free from any air pockets, as described.

LEROY A. WESTON.